US012624812B2

(12) United States Patent
Jin

(10) Patent No.: US 12,624,812 B2
(45) Date of Patent: May 12, 2026

(54) VEHICLE LAMP

(71) Applicant: HYUNDAI MOBIS CO., LTD., Seoul (KR)

(72) Inventor: Min Ji Jin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/280,337

(22) Filed: Jul. 25, 2025

(65) Prior Publication Data

US 2026/0098621 A1 Apr. 9, 2026

(30) Foreign Application Priority Data

Oct. 7, 2024 (KR) ........................ 10-2024-0136061

(51) Int. Cl.

| | |
|---|---|
| ***F21S 41/27*** | (2018.01) |
| ***F21S 41/143*** | (2018.01) |
| ***F21S 41/151*** | (2018.01) |
| ***F21S 41/32*** | (2018.01) |
| ***F21S 43/15*** | (2018.01) |
| ***F21S 43/20*** | (2018.01) |
| ***F21S 43/31*** | (2018.01) |

(52) U.S. Cl.

CPC ............. *F21S 41/27* (2018.01); *F21S 41/143* (2018.01); *F21S 41/151* (2018.01); *F21S 41/322* (2018.01); *F21S 43/15* (2018.01); *F21S 43/2621* (2024.05); *F21S 43/315* (2018.01)

(58) Field of Classification Search

CPC ........ F21S 41/27; F21S 41/322; F21S 41/143; F21S 43/315; F21S 41/151; F21S 43/15; F21S 43/2621

See application file for complete search history.

(56) References Cited

U.S. PATENT DOCUMENTS

| | | | | |
|---|---|---|---|---|
| 11,982,415 | B1 * | 5/2024 | Nam ..................... | F21S 41/265 |
| 2005/0152153 | A1 * | 7/2005 | Amano ................... | F21S 43/26 362/520 |
| 2024/0200743 | A1 * | 6/2024 | Jin .......................... | F21S 41/43 |

* cited by examiner

*Primary Examiner* — Bao Q Truong
(74) *Attorney, Agent, or Firm* — NSIP Law

(57) ABSTRACT

A vehicle lamp including a first light source unit including a plurality of first light source parts, a second light source unit including a plurality of second light source parts, a first total reflection lens including a first lens structure that condenses light radiated from the plurality of first light source parts and emits the light to the front, a second total reflection lens formed integrally with a plurality of second lens structures that condenses light radiated from the plurality of second light source parts and emits the light to the front and formed integrally on the other side of the first total reflection lens, and an emission lens including a first emission lens part disposed in front of the first total reflection lens and a second emission lens part disposed in front of the second total reflection lens.

13 Claims, 11 Drawing Sheets

VEHICLE LAMP

CROSS-REFERENCE TO RELATED APPLICATION

This application claims the benefit of priority to Korean Patent Application No. 10-2024-0136061, filed in the Korean Intellectual Property Office on Oct. 7, 2024, the entire contents of which are incorporated herein by reference.

TECHNICAL FIELD

The present disclosure relates to a vehicle lamp.

BACKGROUND

In general, vehicles are provided with various types of lamps having a lighting function for easily identifying an object located around a vehicle during night traveling and a signal function for notifying other vehicles or road users of a traveling state of the vehicle.

Examples of vehicle lamps include head lamps (headlights) and fog lamps mainly for the purpose of lighting functions and turn signal lamps, tail lamps, brake lamps, side markers and the like for the purpose of signal functions, and installation standards and specifications of these vehicle lamps are regulated by laws so that the respective functions are fully exhibited.

Among the vehicle lamps, a head lamp, which forms a low-beam pattern or a high-beam pattern to ensure a front view of a driver during night driving, plays a very important role in safe driving.

Meanwhile, in recent years, performance of the head lamp is important, but external designs of the head lamp and a light distribution pattern are also important.

However, in the related art, since an aspherical lens having a single focal point should be applied to form a light distribution pattern, it is difficult to implement various designs of the head lamp and the light distribution patten, and thus there is limitation in term of design, and it is difficult to satisfy rapidly changing consumer needs.

Further, in the related art, as different optical systems should be used to form a long-range light distribution pattern and a short-range light distribution pattern, a structure and a manufacturing process are complicated and manufacturing costs increase.

Accordingly, in recent years, various researches are conducted to simplify the structure and the manufacturing process and improve design characteristics of the lamp and the light distribution pattern, but the researches are still insufficient, and thus development thereof is required.

SUMMARY

The present disclosure has been made to solve the above-mentioned problems occurring in the prior art while advantages achieved by the prior art are maintained intact.

An aspect of the present disclosure provides a vehicle lamp that improves light efficiency by simplifying assembly and minimizing an assembly tolerance, through simplification of components.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle lamp includes a first light source unit including a plurality of first light source parts disposed along a first side of the vehicle lamp in a left-right direction; a second light source unit including a plurality of second light source parts disposed along a second side of the vehicle lamp in the left-right direction opposite the first light source unit; a first total reflection lens including a first lens structure configured to condense light radiated from the plurality of first light source parts and to emit the light to a front side of the vehicle lamp; a second total reflection lens formed integrally with a plurality of second lens structures configured to condense light radiated from the plurality of second light source parts and to emit the light to the front side of the vehicle lamp, and formed integrally side-by-side with the first total reflection lens; and an emission lens including a first emission lens part disposed adjacent to the first total reflection lens on front side of the vehicle lamp and a second emission lens part disposed adjacent to the second total reflection lens on front side of the vehicle lamp. A first light distribution pattern is formed by light emitted from the first emission lens part, a second light distribution pattern different from the first light distribution pattern is formed by light emitted from the second emission lens part, and the first light distribution pattern and the second light distribution pattern overlap each other to form a high beam pattern.

The first emission lens part may include a first incident surface on which light output from the first total reflection lens is incident and a first emission surface from which the incident light is output, the second emission lens part may include a second incident surface on which light output from the second total reflection lens is incident and a second emission surface from which the incident light is output, and the first incident surface and the second incident surface may have different shapes.

The first lens structure may include a (1-1)$^{th}$ light incident portion on which light is incident, a (1-2)$^{th}$ light incident portion disposed on both sides of the (1-1)$^{th}$ light incident portion in the left-right direction, and a first body portion integrally formed adjacent to the (1-1)$^{th}$ light incident portion and the (1-2)$^{th}$ light incident portion.

The first body portion may include an integrated light output surface from which the light incident from the (1-1)$^{th}$ light incident portion and the (1-2)$^{th}$ light incident portion is emitted to the front side of the vehicle lamp, and the integrated light output surface may be a curved surface, and a cross-sectional shape of the integrated light output surface in the left-right direction may be concavely curved in a direction toward the first light source unit.

A central axis of the (1-2)$^{th}$ light incident portion may be formed at an angle different from that of a central axis of the (1-1)$^{th}$ light incident portion, and central axes of the (1-2)$^{th}$ light incident portions may be formed to be symmetrical to each other with respect to the central axis of the (1-1)$^{th}$ light incident portion.

A path of the light incident from the (1-1)$^{th}$ light incident portion may form a horizontal focal point on the integrated light output surface, and an optical path by a first portion of the light incident from the (1-2)$^{th}$ light incident portion may form a same horizontal focal point as the horizontal focal point by the (1-1)$^{th}$ light incident portion on the integrated light output surface, and an optical path of a second portion thereof may be defocused on the integrated light output surface.

The first body portion may include a first lower surface and a first upper surface disposed above the first lower surface, and the first upper surface may be inclined downward toward the integrated light output surface.

Each of the plurality of second lens structures may include a second light incident portion on which light is incident and a second body portion disposed adjacent the second light incident portion and having an individual light output surface through which the light is emitted to the front side of the vehicle lamp, and the plurality of individual light output surfaces in the plurality of second lens structures may be formed on different planes.

Light guided by the plurality of second lens structures may form a plurality of vertical focal points based on a vertical direction, and the plurality of vertical focal points may be formed on the individual light output surfaces and bent in bent directions of the individual light output surfaces.

The second body portion may include a second lower surface and a second upper surface disposed above the second lower surface, and the second upper surface may be inclined downward toward the individual light output surface.

The first incident surface may be convex in a direction toward the first total reflection lens based on the left-right direction, and the first emission surface may be convex toward the front side of the vehicle lamp based on the left-right direction.

The second incident surface may be bent in a direction toward the second total reflection lens from a first end of the vehicle lamp to a second end of the vehicle lamp in the left-right direction, and the second emission surface may be bent in a shape corresponding to the second incident surface based on the left-right direction.

The first emission surface and the second emission surface may be continuous.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments suitable for understanding technical features of a vehicle lamp according to the present disclosure. However, the present disclosure is not limited to the embodiments described below, the technical features of the present disclosure are not limited by the described embodiments, and various modifications may be made within the technical scope of the present disclosure.

Figure 1:
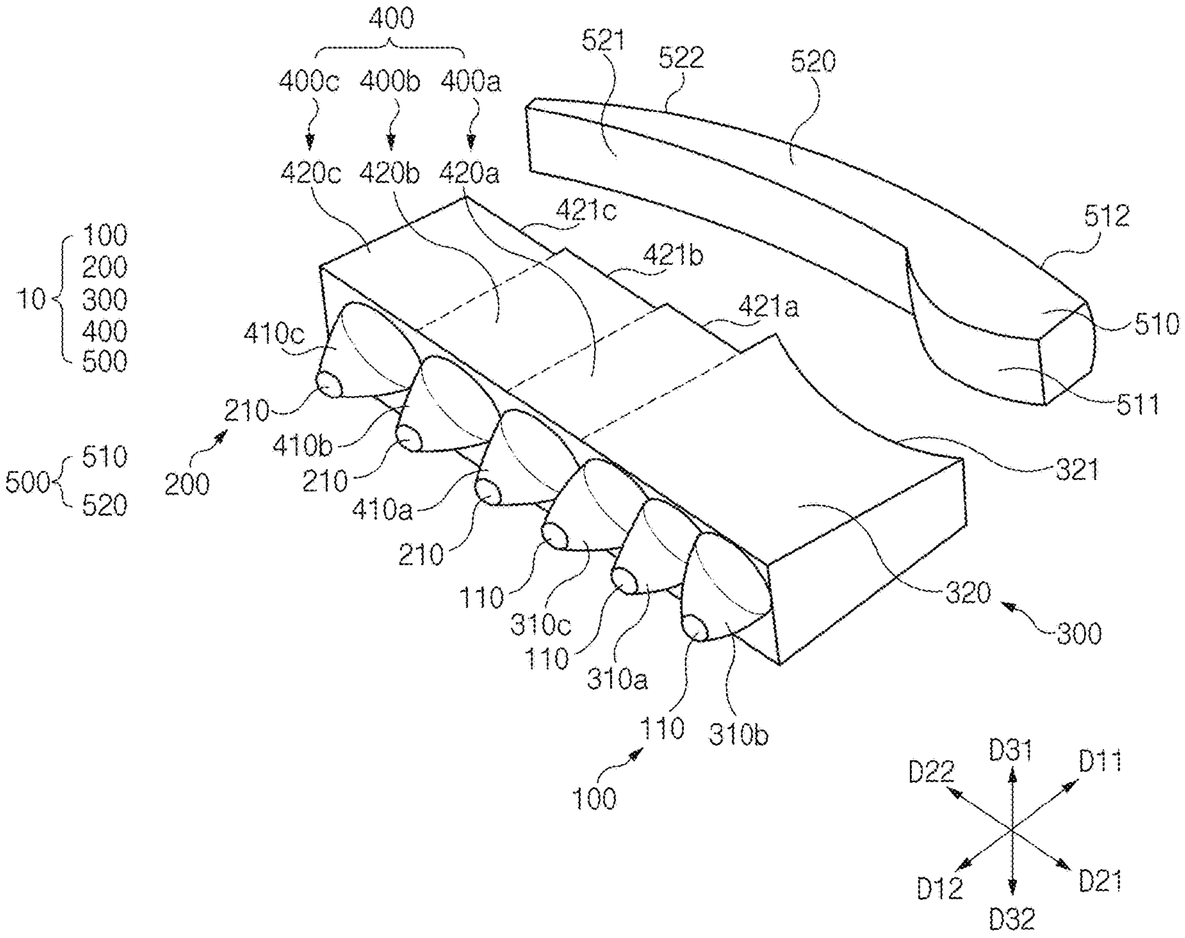
FIG. 1 is a perspective view illustrating a vehicle lamp according to an embodiment of the present disclosure.
Figure 2:
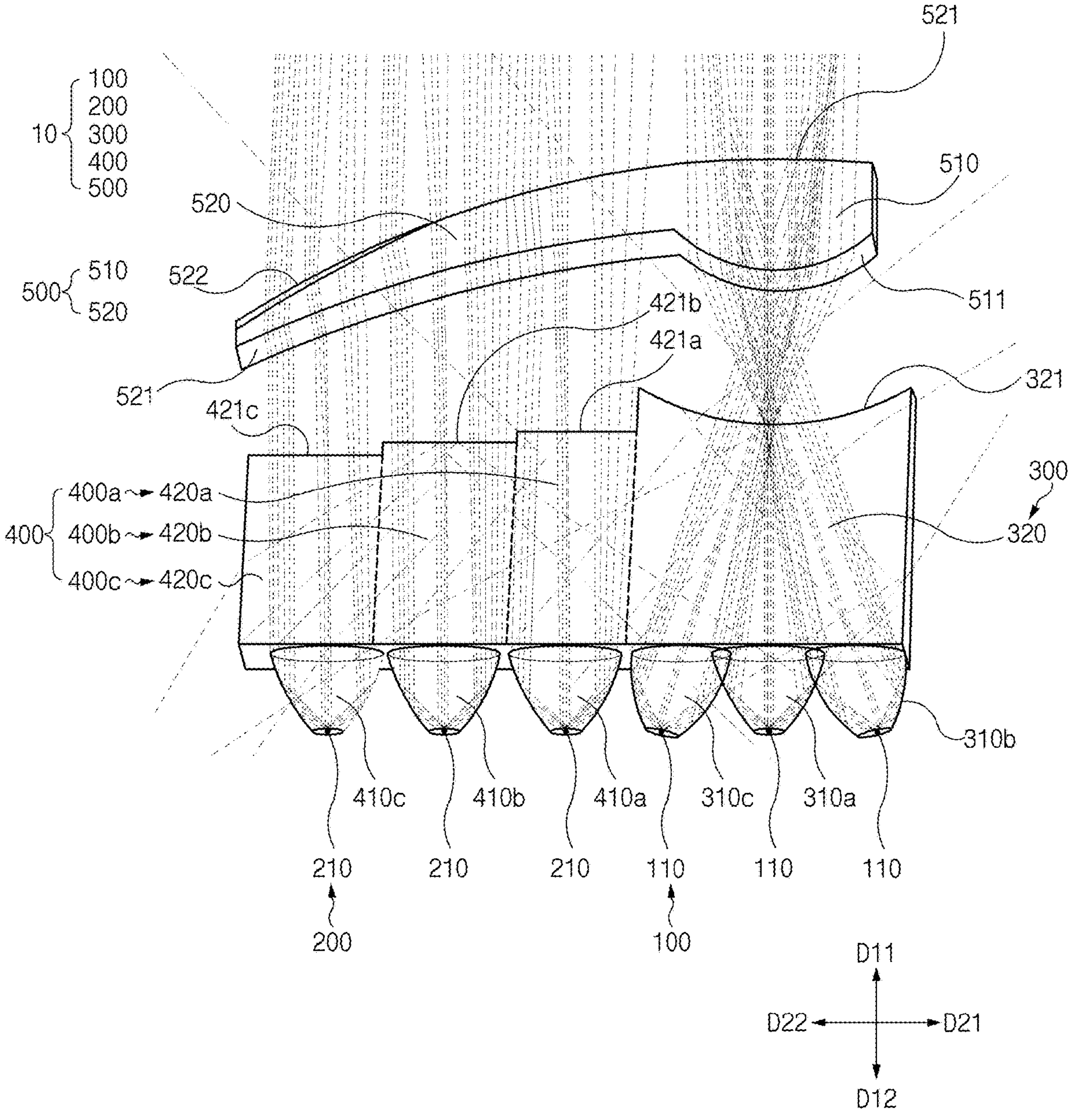
FIG. 2 is a top view illustrating the vehicle lamp according to the embodiment of the present disclosure.
Figure 3:
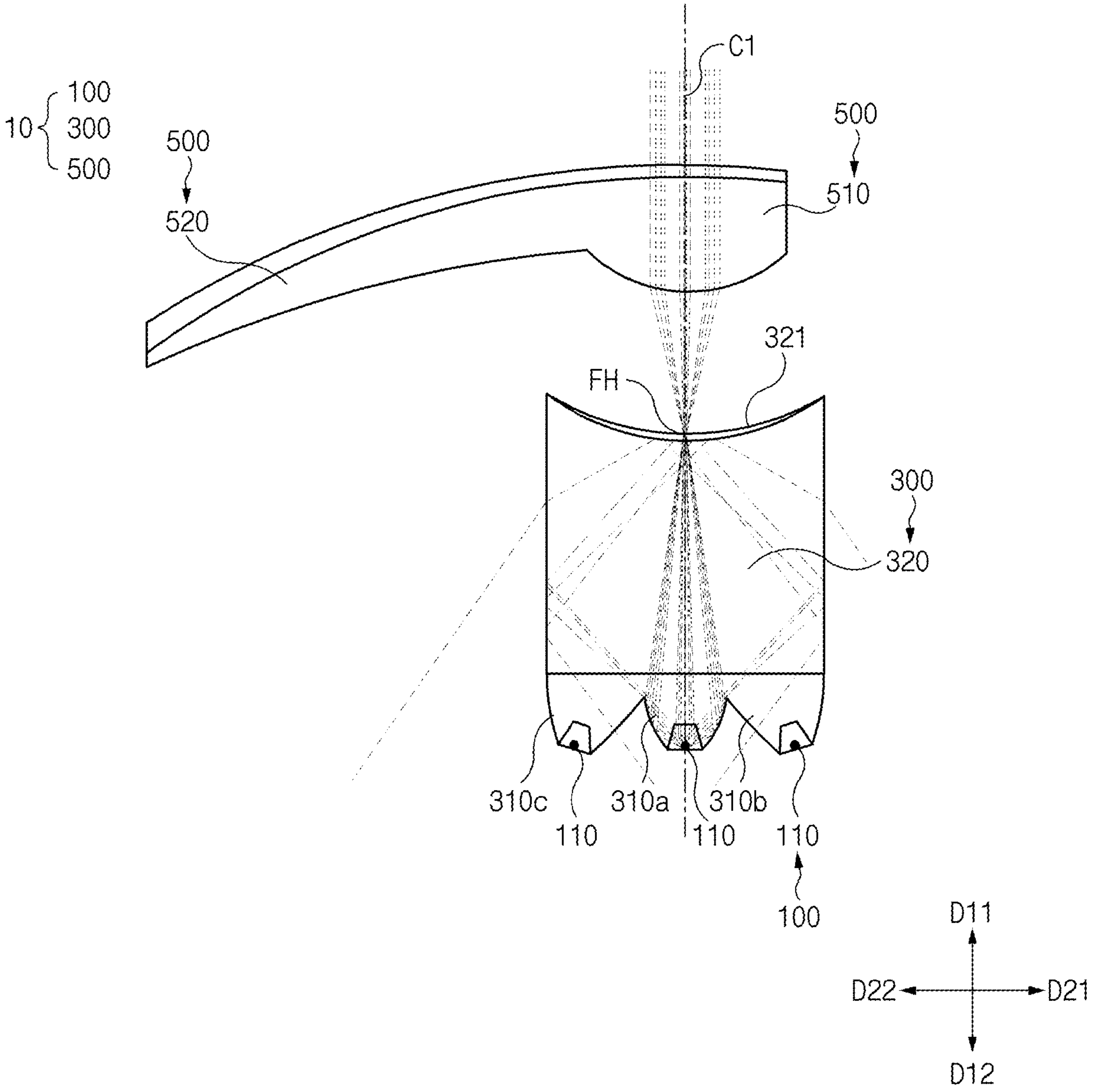
FIG. 3 is a top view illustrating a first light source unit, a first total reflection lens, and a first emission lens part according to the embodiment of the present disclosure and is a view illustrating a path of light incident on a (1-1)th light incident portion.
Figure 4:
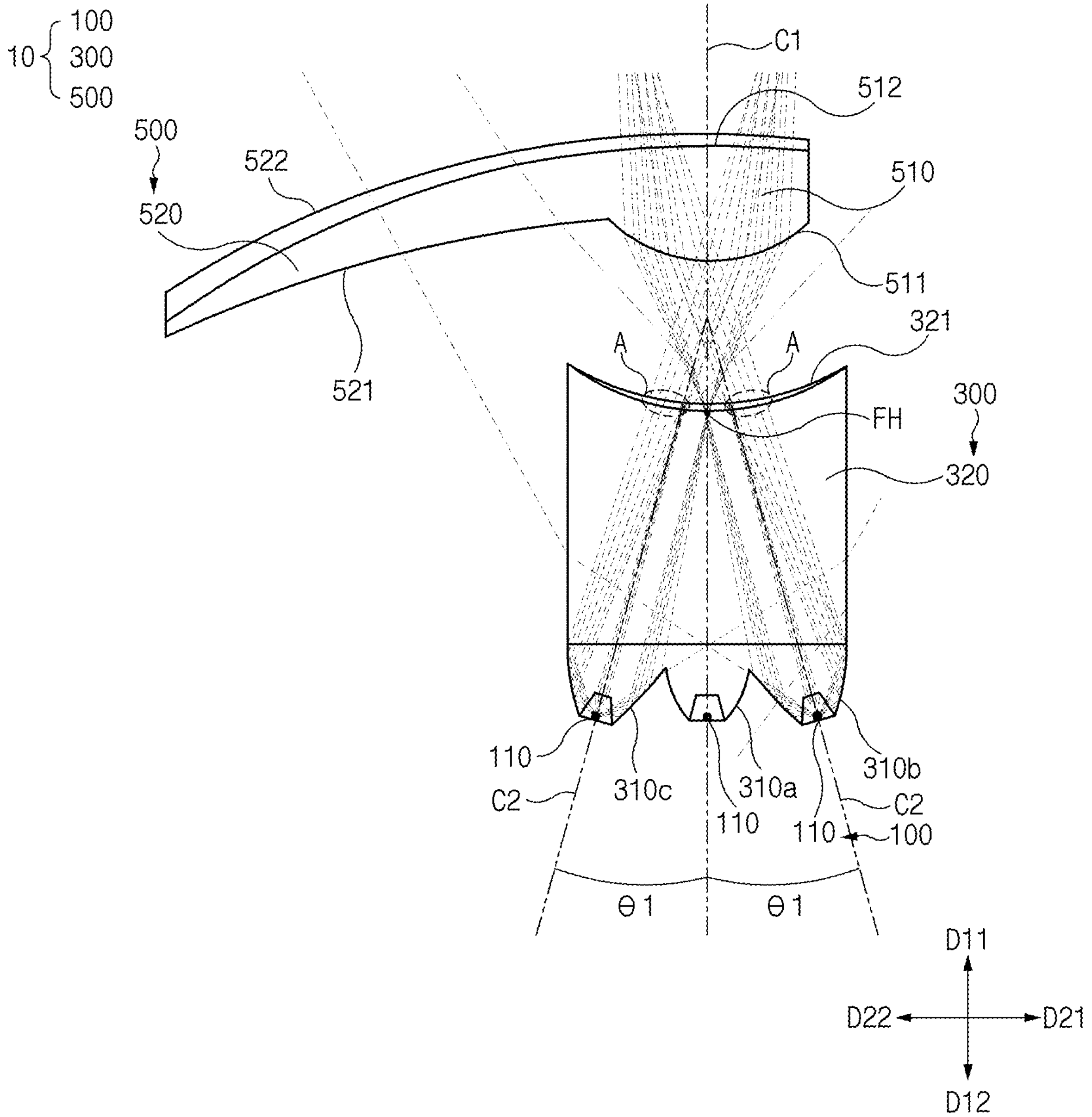
FIG. 4 is a top view illustrating the first light source unit, the first total reflection lens, and the first emission lens part according to the embodiment of the present disclosure and is a view illustrating a path of light incident on a (1-2)th light input part.
Figure 5:
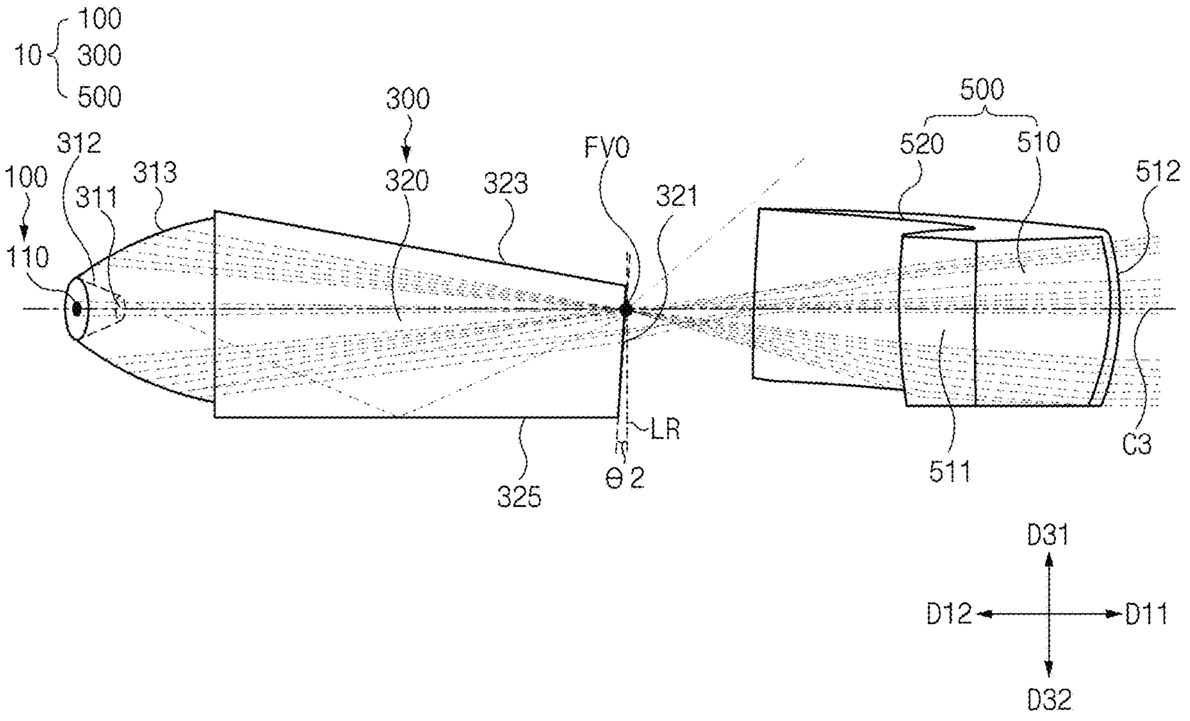
FIG. 5 is a side view of the first light source unit, the first total reflection lens, and the first emission lens part according to the present disclosure when viewed from the side.
Figure 6:
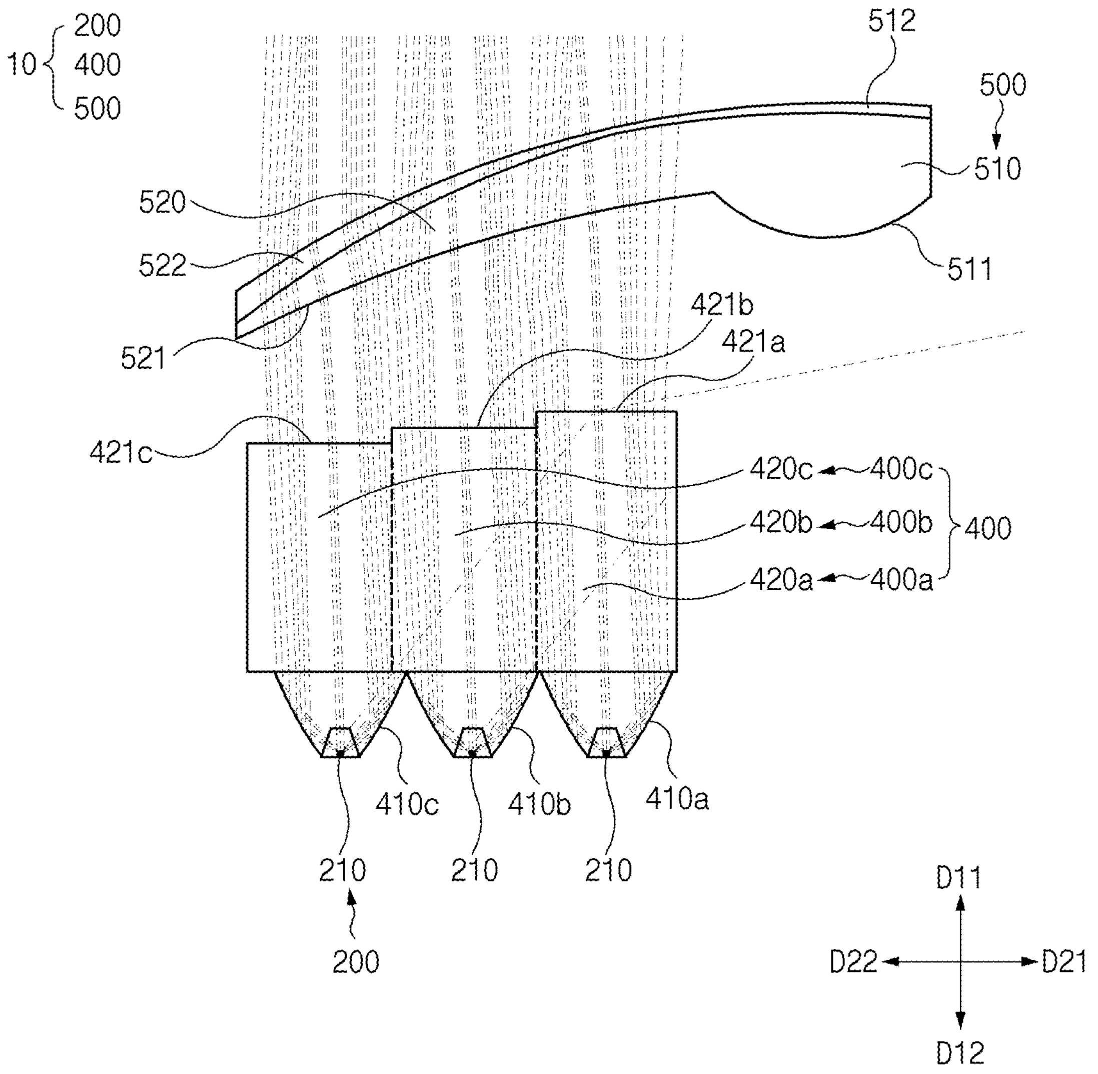
FIG. 6 is a top view illustrating a second light source unit, a second total reflection lens, and a second emission lens part according to the present disclosure.
Figure 7:
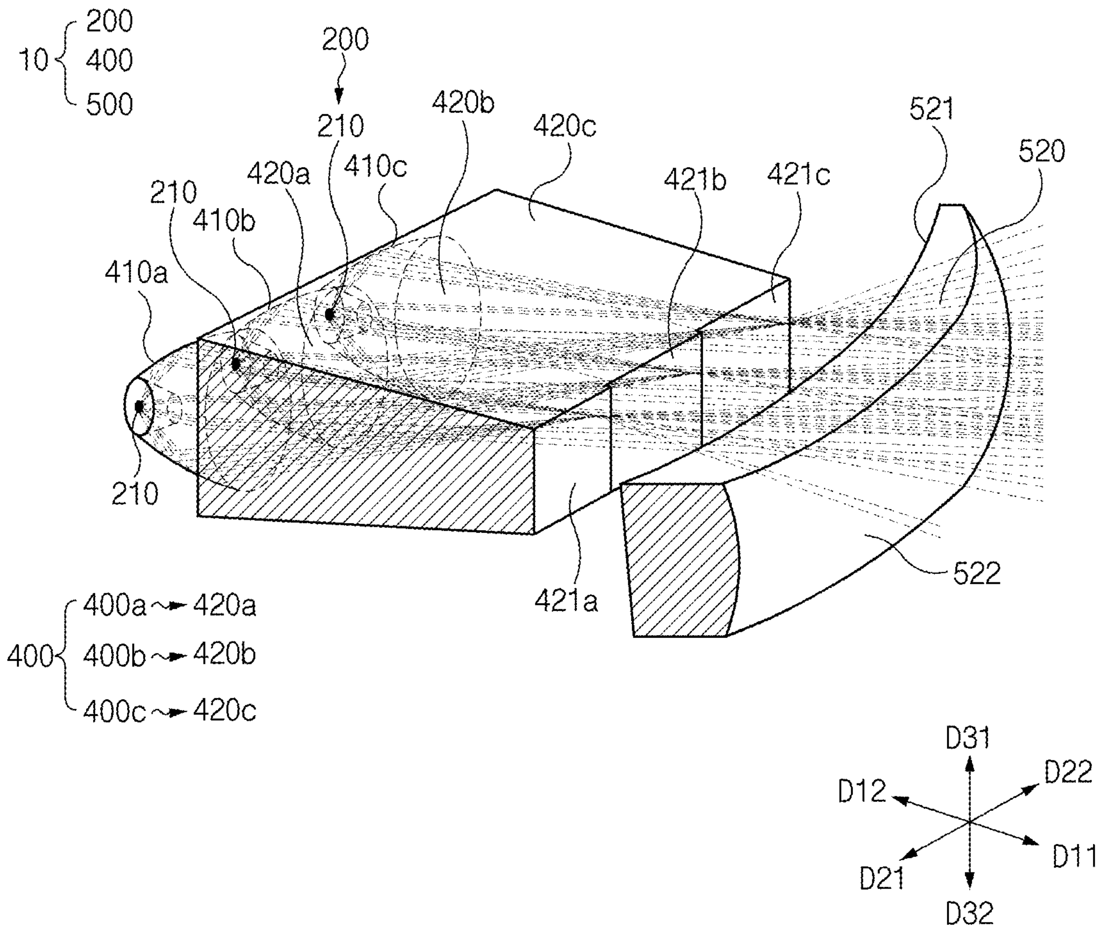
FIG. 7 is a perspective view illustrating the second light source unit, the second total reflection lens, and the second emission lens part according to the present disclosure and is a view when viewed from the front.
Figure 8:
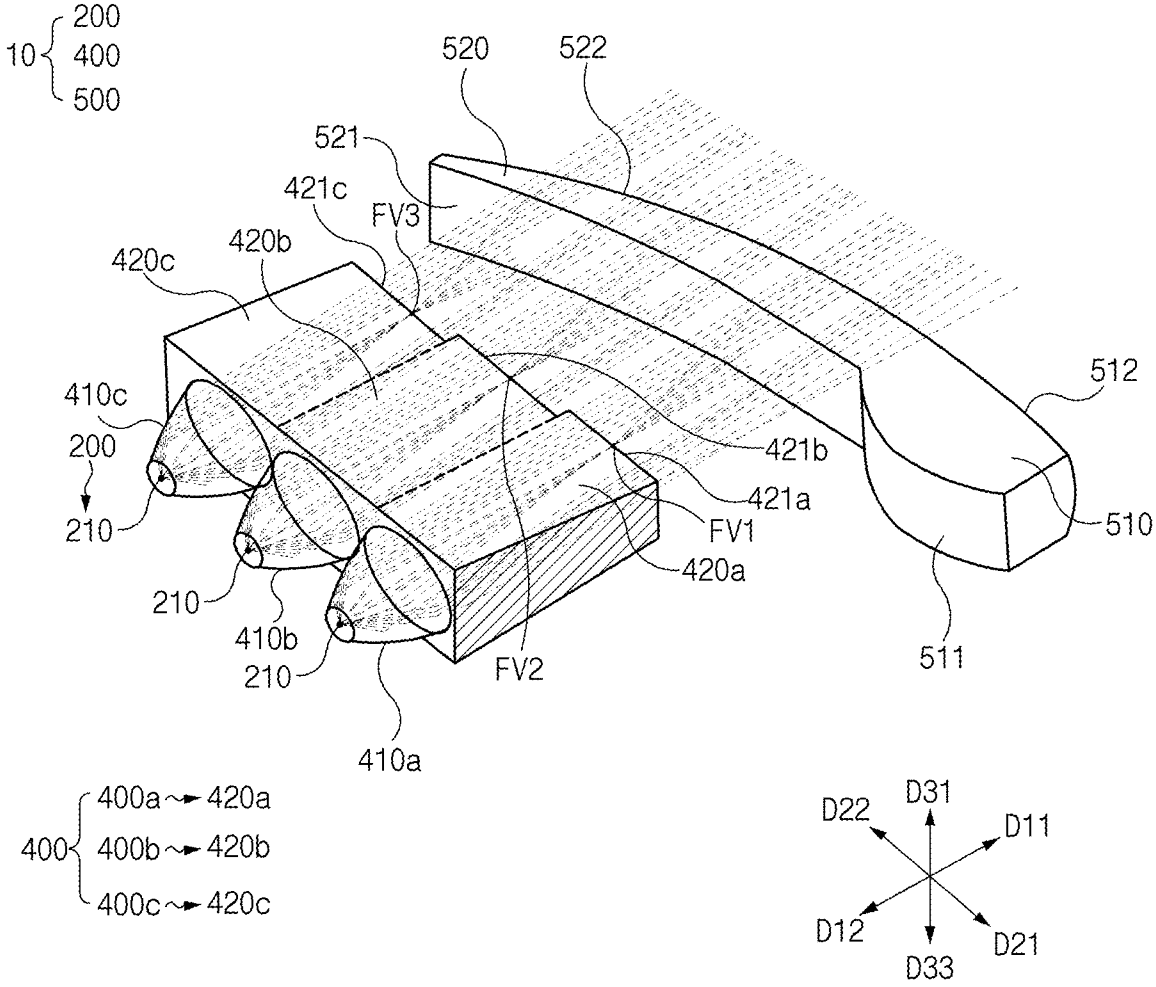
FIG. 8 is a perspective view illustrating the second light source unit, the second total reflection lens, and the second emission lens part according to the present disclosure and is a view when viewed from the rear.

FIG. 1 is a perspective view illustrating a vehicle lamp according to an embodiment of the present disclosure, FIG. 2 is a top view illustrating the vehicle lamp according to the embodiment of the present disclosure, FIG. 3 is a top view illustrating a first light source unit, a first total reflection lens, and a first emission lens part according to the embodiment of the present disclosure and is a view illustrating a path of light incident on a $(1\text{-}1)^{th}$ light incident portion, FIG. 4 is a top view illustrating the first light source unit, the first total reflection lens, and the first emission lens part according to the embodiment of the present disclosure and is a view illustrating a path of light incident on a $(1\text{-}2)^{th}$ light input part, FIG. 5 is a side view of the first light source unit, the first total reflection lens, and the first emission lens part according to the present disclosure when viewed from the side, FIG. 6 is a top view illustrating a second light source unit, a second total reflection lens, and a second emission lens part according to the present disclosure, FIG. 7 is a perspective view illustrating the second light source unit, the second total reflection lens, and the second emission lens part according to the present disclosure and is a view when viewed from the front, and FIG. 8 is a perspective view illustrating the second light source unit, the second total reflection lens, and the second emission lens part according to the present disclosure and is a view when viewed from the rear.

Referring to FIGS. 1 to 11, a vehicle lamp 10 according to an embodiment of the present disclosure includes a first light source unit 100, a second light source unit 200, a first total reflection lens 300, a second total reflection lens 400, and an emission lens 500.

For reference, in FIGS. 1 to 8, D11 represents a front side, and D12 represents a rear side. D21 represents an in-board direction of a vehicle toward one end, and D22 represents an out-board direction of the vehicle toward the other end. D31 is an upward direction, and D32 is a downward direction. However, an up-down direction and a left-right direction may be directions based on the illustrated drawings, and the up-down direction and the left-right direction may be changed according to an environment in which the vehicle lamp 10 is installed.

The first light source unit 100 includes a plurality of first light source parts 110 and is disposed at one side based on the left-right direction. Further, the second light source unit 200 includes a plurality of second light source parts 210 and is disposed on the other side of the first light source unit 100.

In detail, the plurality of first light source parts 110 may be arranged in the left-right direction. Further, the plurality of second light source parts 210 may be arranged in the left-right direction. An element or device capable of emitting light may be used for the first light source part 110 and the second light source part 210. For example, the first light source part 110 and the second light source part 210 may be provided as light emitting diodes (hereinafter, referred to as LEDs). Further, the first light source part 110 and the second light source part 210 may be mounted on a board part (not illustrated) such as a printed circuit board.

The first total reflection lens 300 includes a first lens structure 300 provided to condense light radiated from the plurality of first light source parts 110 and emit the light to the front. The first lens structure 300 may be provided to receive light incident from the plurality of first light source parts 110 by internal total reflection and emit the light toward the emission lens 500.

A plurality of second lens structures 400*a*, 400*b*, and 400*c* that condense light radiated from the plurality of second light source parts 210 and emit the light to the front are integrally formed in the second total reflection lens 400. Further, the second total reflection lens 400 is integrally formed on the other side of the first total reflection lens 300.

Further, the emission lens 500 includes a first emission lens part 510 disposed in front of the first total reflection lens 300 and a second emission lens part 520 disposed in front of the second total reflection lens 400.

Figure 9:
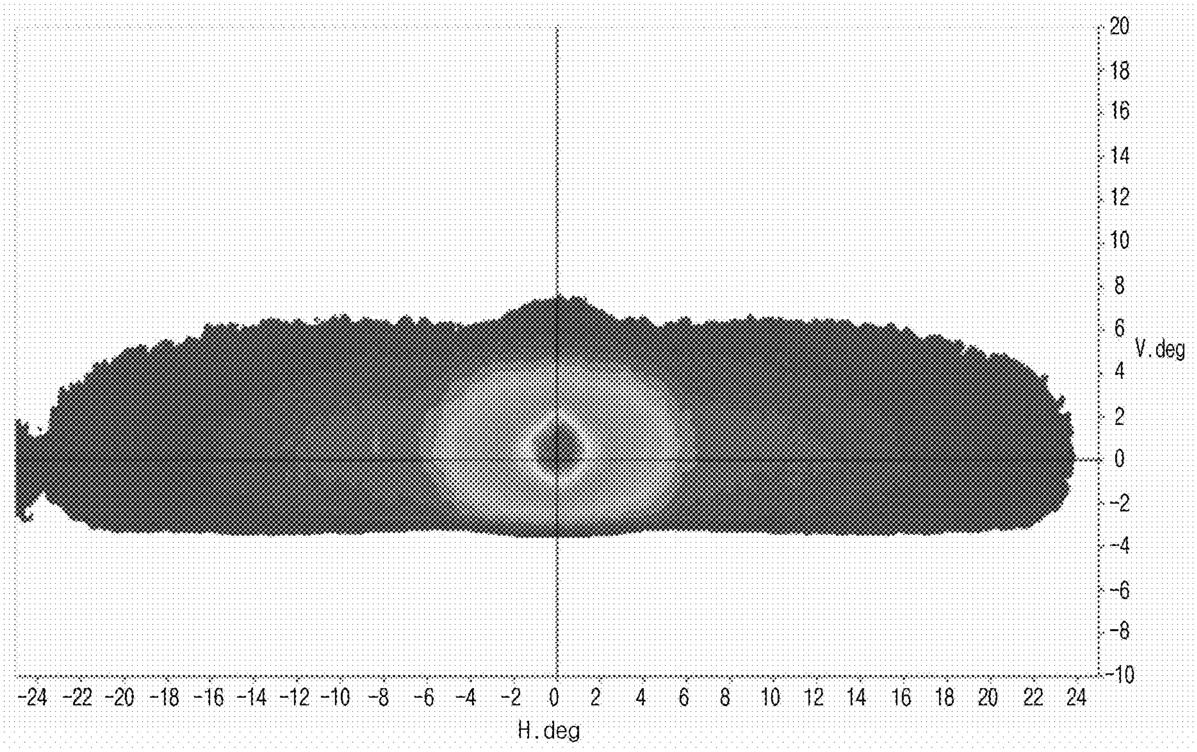
FIG. 9 is an image illustrating a first light distribution pattern by a vehicle lamp according to the embodiment of the present disclosure.
Figure 10:
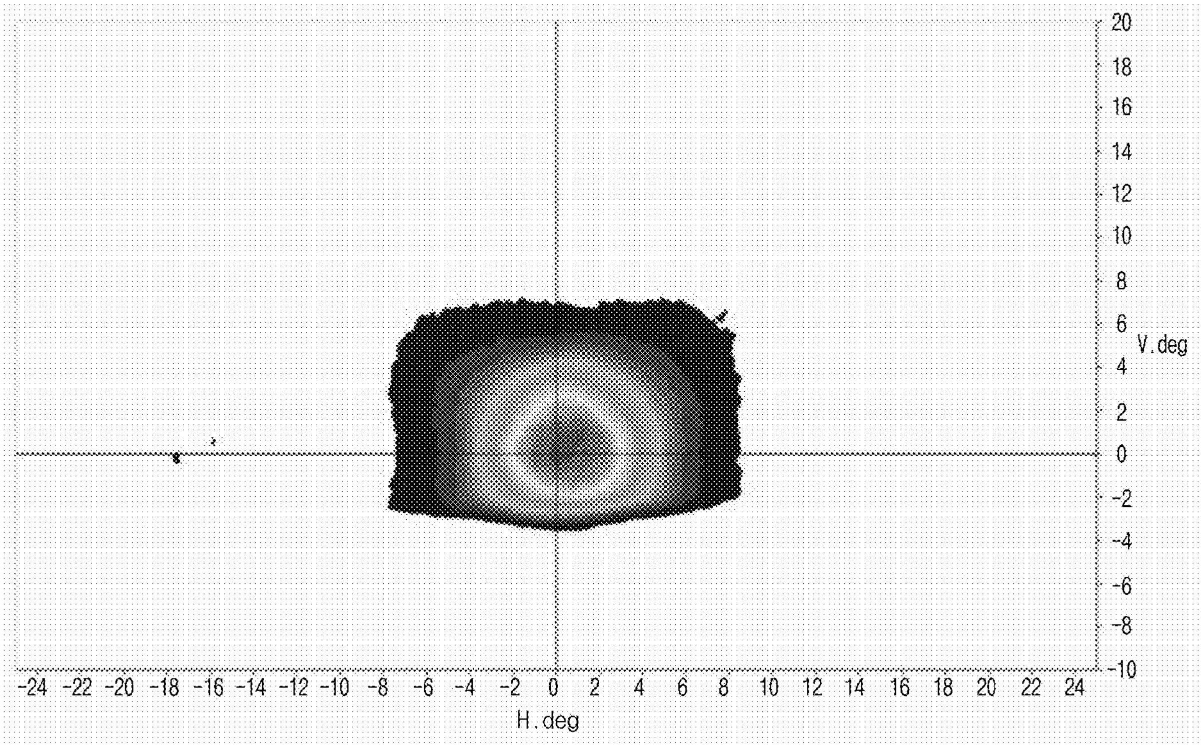
FIG. 10 is an image illustrating a second light distribution pattern by the vehicle lamp according to the embodiment of the present disclosure.
Figure 11:
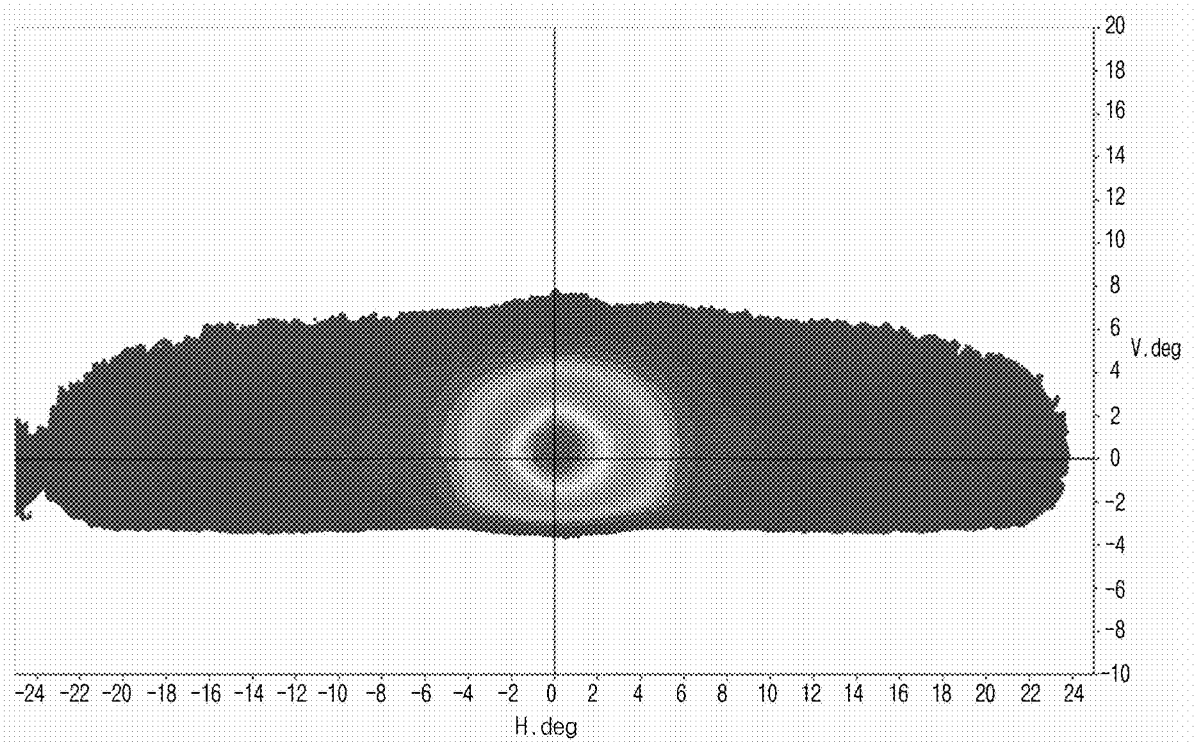
FIG. 11 is an image illustrating a high beam pattern that overlaps the first light distribution pattern and the second light distribution pattern by the vehicle lamp according to the embodiment of the present disclosure.

Here, a first light distribution pattern is formed by light emitted from the first emission lens part 510 (see FIG. 9). Further, a second light distribution pattern different from the first light distribution pattern is formed by light emitted from the second emission lens part 520 (see FIG. 10). Further, the first light distribution pattern and the second light distribution pattern may overlap each other to form a high beam pattern of a head lamp (see FIG. 11).

In the specification, the fact that characteristics of the light distribution patterns are different from each other means that light distribution characteristics and projected pattern images of the first light distribution pattern and the second light distribution pattern are different from each other. This may be implemented by a difference between characteristics and shapes of the first total reflection lens 300 and the second total reflection lens 400 and the first emission lens part 510 and the second emission lens part 520.

For example, the first light distribution pattern may be a light distribution pattern (Wide Zone) for securing a field of view in a front peripheral area and securing visibility during turning. Further, the second light distribution pattern may be a long-range light distribution pattern (Hot Zone) for securing a view of a front central area. The first light distribution pattern and the second light distribution pattern may overlap each other to form the high beam pattern.

In detail, the first total reflection lens 300 and the second total reflection lens 400 may be formed integrally and formed as a single body. The first total reflection lens 300 is obtained by integrally forming a member for guiding light incident from the plurality of first light source parts 110.

The second lens structures 400*a*, 400*b*, and 400*c* may serve to condense light radiated from the second light source part 210 and guide the light to the front. The light radiated to the front may be emitted to the front through the emission lens 500 to form the second light distribution pattern having the high beam pattern.

In this way, a member for guiding and condensing light for forming a plurality of light distribution patterns may be formed as a single body, thereby implementing component simplification. Further, therefore, assembly may be simplified, assembly tolerances may be minimized, and light efficiency may be improved.

The emission lens 500 includes the first emission lens part 510 disposed in front of the first total reflection lens 300 and the second emission lens part 520 disposed in front of the second total reflection lens 400.

The first emission lens part 510 may include a first incident surface 511 on which light output from the first total reflection lens 300 is incident and a first emission surface 512 from which the incident light is output.

In detail, the first incident surface 511 may be formed as a spherical surface formed convexly in a direction toward the first total reflection lens 300. Further, the first emission surface 512 may be formed as a spherical surface formed convexly toward the front. For example, the first incident surface 511 and the first emission surface 512 may be formed symmetrically in the left-right direction with respect to an optical axis of the first emission lens part 510.

The second emission lens part 520 may include a second incident surface 521 on which light output from the second total reflection lens 400 is incident and a second emission surface 522 from which the incident light is output. Further, the first incident surface 511 and the second incident surface 521 may be formed in different shapes.

In detail, the second incident surface 521 may be bent to be closer to the second total reflection lens 400 as it goes from one end to the other end based on the left-right direction. Accordingly, the second incident surface 521 and the second emission lens part 520 may be formed asymmetrically in the left-right direction based on an optical axis of the second emission lens part 520.

Here, the second emission lens part 520 may be formed to extend in the left-right direction to cover all of the plurality of second lens structures 400*a*, 400*b*, and 400*c*. In this way, the first incident surface 511 and the second incident surface 521 may be formed in different shapes.

Further, the first emission surface 512 may be formed in a convex shape to the front. Further, the first emission surface 512 may be symmetrical with respect to the optical axis of the first emission lens part 510.

Further, the second emission surface 522 may be bent to be closer to the second total reflection lens 400 as it goes from one end to the other end based on the left-right direction. Accordingly, the second emission surface 522 may be formed asymmetrically in the left-right direction with respect to the optical axis of the second emission lens part 520.

Here, the first emission surface 512 and the second emission surface 522 may be formed in different shapes but may be continuously formed without a stepped portion in the left-right direction. The first emission surface 512 and the second emission surface 522 disposed in the front and forming an exterior of the vehicle lamp 10 are continuously formed, and thus the vehicle lamp 10 according to the present disclosure may provide an advantageous design effect by minimizing a disconnection sense between the light distribution patterns having different characteristics.

Meanwhile, the first light distribution pattern may be formed by the light emitted from the first emission lens part 510 (see FIG. 9). Further, the second light distribution pattern having characteristics different from those the first light distribution pattern may be formed by the light emitted from the second emission lens part 520 (see FIG. 10). Further, the first light distribution pattern and the second light distribution pattern may overlap each other to form the high beam pattern (see FIG. 11.

In the specification, the fact that characteristics of the light distribution patterns are different from each other means that light distribution characteristics and projected pattern images of the first light distribution pattern and the second light distribution pattern are different from each other. This may be implemented by a difference between characteristics and shapes of the first total reflection lens 300 and the second total reflection lens 400 and the first emission lens part 510 and the second emission lens part 520.

The first lens structure 300 may include a (1-1)$^{th}$ light incident portion 310*a* and (1-2)$^{th}$ light incident portions 310*b* and 310*c*, through which light is incident, and a first body portion 320.

The (1-2)$^{th}$ light incident portions 310*b* and 310*c* may be arranged on both sides of the (1-1)$^{th}$ light incident portion 310*a* in the left-right direction. In detail, the two (1-2)$^{th}$ light incident portions 310*b* and 310*c* may be formed and may be formed symmetrically with respect to the (1-1)$^{th}$ light incident portion 310*a*.

The first body portion 320 may be integrally formed in front of the (1-1)$^{th}$ light incident portion 310*a* and the (1-2)$^{th}$ light incident portions 310*b* and 310*c*. In detail, the (1-1)$^{th}$ light incident portion 310*a* and the (1-2)$^{th}$ light incident portions 310*b* and 310*c* may be integrally formed on a rear surface of the first body portion 320.

In detail, the first lens structure 300 may be a total internal reflection (TIR) lens that guides and condenses light incident by total internal reflection. The (1-1)$^{th}$ light incident portion 310*a* may include a central light incident surface 311 and a side light incident surface 312 on which light is incident and a total reflection surface 313 by which the incident light is totally reflected. Optical characteristics of the first lens structure 300 may be determined by a shape of the (1-1)$^{th}$ light incident portion 310*a* formed according to a focal length of the first lens structure 300, a focal length of the second emission lens part 520, a depth of the central light incident surface 311, a size (diameter) of the central light incident surface 311, and an inclination angle of the side light incident surface 312. The (1-2)$^{th}$ light incident portions 310*b* and 310*c* may have a structure similar to that of the (1-1)$^{th}$ light incident portion 310*a*.

The first body portion 320 forms a body of the first lens structure 300, and the light incident on the (1-1)$^{th}$ light incident portion 310*a* and the (1-2)$^{th}$ light incident portions 310*b* and 310*c* may undergo internal total reflection in the first body portion 320.

Meanwhile, the first body portion 320 may include an integrated light output surface 321 that emits light incident from the (1-1)$^{th}$ light incident portion 310*a* and the (1-2)$^{th}$ light incident portions 310*b* and 310*c* to the front.

The integrated light output surface 321 may be formed in a curved surface, and a cross-sectional shape of the integrated light output surface 321 in the left-right direction may be formed in a concavely curved shape in a direction toward the first light source unit 100.

In detail, the first total reflection lens 300 may include the one first lens structure 300, and the first lens structure 300 may include the one integrated light output surface 321. In the embodiment of the present disclosure, the first lens structure 300 may include a plurality of light incident portions (the (1-1)$^{th}$ light incident portion 310*a* and the (1-2)$^{th}$ light incident portions 310*b* and 310*c*), and the light incident on the plurality of light incident portions may be emitted through the one integrated light output surface 321. The integrated light output surface 321 may be continuously formed without a stepped portion.

Further, central axes C2 of the (1-2)$^{th}$ light incident portions 310*b* and 310*c* may be formed at an angle different from that of a central axis C1 of the (1-1)$^{th}$ light incident portion 310*a*. Further, the central axes C2 of the plurality of (1-2)$^{th}$ light incident portions 310*b* and 310*c* may be formed symmetrically to each other with respect to the central axis C1 of the (1-1)$^{th}$ light incident portion 310*a*.

In detail, referring to the embodiment illustrated in FIG. 3, the light incident on the (1-1)$^{th}$ light incident portion 310*a* may form one focal point FH and may be emitted through the first emission lens part 510 to form a central area of the first light distribution pattern.

Meanwhile, referring to the embodiment illustrated in FIG. 4, the (1-2)$^{th}$ light incident portions 310*b* and 310*c* may be formed to radiate light in a direction toward the central axis C1 of the (1-1)$^{th}$ light incident portion 310*a*. Further, the central axes C2 of the (1-2)$^{th}$ light incident portions 310*b* and 310*c* may form a predetermined angle θ1 with respect to the central axis C1 of the (1-1)$^{th}$ light incident portion 310*a*. The light incident on the (1-2)$^{th}$ light incident portions 310*b* and 310*c* and then emitted through the first emission lens part 510 may be provided to form a peripheral area of the first light distribution pattern due to the shape of the (1-2)$^{th}$ light incident portions 310*b* and 310*c*.

Accordingly, the light incident on the (1-1)$^{th}$ light incident portion 310*a* and traveling may improve a luminous intensity of the first light distribution pattern, and the light incident on the (1-2)$^{th}$ light incident portions 310*b* and 310*c* may be spread in a horizontal direction to satisfy light distribution requirements of the first light distribution pattern.

Further, referring to FIGS. 3 and 4, a path of the light incident from the (1-1)$^{th}$ light incident portion 310*a* may be provided to form a horizontal focal point FH on the integrated light output surface 321.

Further, an optical path by a portion of the light incident from the (1-2)$^{th}$ light incident portions 310*b* and 310*c* may be provided to form the same horizontal focal point FH as the horizontal focal point of the (1-1)$^{th}$ light incident portion 310*a* on the integrated light output surface 321.

Further, an optical path by the other portion of the light incident from the (1-2)$^{th}$ light incident portions 310*b* and 310*c* may be provided to be defocused on the integrated light output surface 321.

In detail, the light incident from the (1-2)$^{th}$ light incident portions 310*b* and 310*c* and guided does not travel to be focused on one focal point, but may be provided (defocused) such that the portion of the light forms the focal point and the other portion of the light does not form the focal point on the integrated light output surface 321. Accordingly, the light incident from the (1-2)$^{th}$ light incident portions 310*b* and 310*c* and guided is emitted through the first emission lens part 510 and is spread in the horizontal direction, thereby forming a light distribution of the first light distribution pattern having the high beam pattern.

Accordingly, turning visibility of the first light distribution pattern may be secured, and light distribution performance may be satisfied.

Meanwhile, referring to FIG. 5, the first body portion 320 may include a first lower surface 325 and a first upper surface 323 provided above the first lower surface 325. Further, the first upper surface 323 may be formed to be inclined downward as it goes to the integrated light output surface 321.

For example, the first lower surface 325 of the first body portion 320 may extend in a direction parallel to an optical axis, and the first upper surface 323 of the first body portion 320 may be formed to be inclined downward toward the front. Accordingly, the light incident through the $(1\text{-}1)^{th}$ light incident portion 310*a* and the $(1\text{-}2)^{th}$ light incident portions 310*b* and 310*c* may move more to a lower area than to an upper area with respect to the optical axis due to total reflection inside the first body portion 320, and as a result, more light may be emitted upward when emitted through the first emission lens part 510.

Accordingly, a light distribution of the high beam pattern of the head lamp for securing upward visibility may be secured, and light distribution performance may be improved.

Meanwhile, referring to the embodiment illustrated in FIGS. 6 to 8, the plurality of second lens structures 400*a*, 400*b*, and 400*c* may include second light incident portions 410*a*, 410*b*, and 410*c* and second body portions 420*a*, 420*b*, and 420*c* arranged in front of the second light incident portions 410*a*, 410*b*, and 410*c*, respectively. Individual light output surfaces 421*a*, 421*b*, and 421*c* through which light is emitted to the front may be formed in the second body portions 420*a*, 420*b*, and 420*c*, respectively.

Further, the plurality of individual light output surfaces 421*a*, 421*b*, and 421*c* respectively provided in the plurality of second lens structures 400*a*, 400*b*, and 400*c* may be formed on different planes.

In detail, the second lens structures 400*a*, 400*b*, and 400*c* may be a TIR lens that guides and condenses light incident by total internal reflection. A structure of the second light incident portions 410*a*, 410*b*, and 410*c* may be similar to that of the first light incident portion but may differ from the first light incident portion in terms of the depth of the central light incident surface, the size (diameter) of the central light incident surface, and the inclination angle of the side light incident surface.

Unlike the first total reflection lens 300, the second total reflection lens 400 may have a shape in which the plurality of second lens structures 400*a*, 400*b*, and 400*c* are integrally formed. Optical paths of the light guided by the plurality of second lens structures 400*a*, 400*b*, and 400*c* may be different from each other. Further, the plurality of second lens structures 400*a*, 400*b*, and 400*c* may include the second light incident portions 410*a*, 410*b*, and 410*c* and the second body portions 420*a*, 420*b*, and 420*c*, respectively, but shapes of the plurality of second light incident portions 410*a*, 410*b*, and 410*c* may be formed differently, and shapes of the plurality of second body portions 420*a*, 420*b*, and 420*c* may be formed differently. This may correspond to a shape (e.g., a shape formed to be bent) of the second emission lens part 520.

The light incident on the plurality of second light incident portions 410*a*, 410*b*, and 410*c* may be emitted to the front through the individual light output surfaces 421*a*, 421*b*, and 421*c* corresponding to the second light incident portions 410*a*, 410*b*, and 410*c*, respectively.

For example, as in the embodiment illustrated in FIGS. 1 to 8, an incident surface and an emission surface of the second emission lens part 520 may be formed to be bent as they go toward the other side. Further, the plurality of individual light output surfaces 421*a*, 421*b*, and 421*c* may be formed at different positions to correspond to the bent direction of the second emission lens part 520. For example, as the individual light output surface is located closer to the other side, the individual light output surface is disposed closer to the second light source unit 200.

Further, the light guided by the plurality of second lens structures 400*a*, 400*b*, and 400*c* may form a plurality of vertical focal points FV1, FV2, and FV3 based on a vertical direction, respectively. Further, the plurality of vertical focal points FV1, FV2, and FV3 may be formed on the individual light output surfaces 421*a*, 421*b*, and 421*c* and bent in bent directions of the individual light output surfaces 421*a*, 421*b*, and 421*c*.

In detail, the second emission surface 522 and the second incident surface 521 may be formed to be bent, and thus the vertical focal points FV1, FV2, and FV3 at portions of the second emission lens part 520 may be different from each other. Thus, the vertical focal points of the second lens structures 400*a*, 400*b*, and 400*c* may be formed at different positions to correspond to different focal points at the portions of the second emission lens part 520.

Further, the vertical focal points of the second lens structures 400*a*, 400*b*, and 400*c* may be formed on the individual light output surfaces 421*a*, 421*b*, and 421*c*, and the plurality of individual light output surfaces 421*a*, 421*b*, and 421*c* may be formed at different positions, like the vertical focal points.

Accordingly, even when the second emission lens part 520 is formed to be bent to correspond to a shape of the vehicle, the second light distribution pattern that satisfies light distribution and light distribution performance may be formed.

Meanwhile, the second body portions 420*a*, 420*b*, and 420*c* may include second lower surfaces and second upper surfaces provided above the second lower surfaces. Further, the second upper surfaces may be inclined downward as they go toward the individual light output surfaces 421*a*, 421*b*, and 421*c*.

For example, the second lower surfaces of the second body portions 420*a*, 420*b*, and 420*c* may extend in a direction parallel to the optical axis, and the second upper surfaces of the second body portions 420*a*, 420*b*, and 420*c* may be inclined downward as they go toward the front. Accordingly, the light incident through the second light incident portions 410*a*, 410*b*, and 410*c* may move more to a lower area than to an upper area with respect to the optical axis due to total reflection inside the second body portions 420*a*, 420*b*, and 420*c*, and as a result, more light may be emitted upward when emitted through the second emission lens part 520.

Accordingly, a light distribution of the high beam pattern of the head lamp for securing upward visibility may be secured, and light distribution performance may be improved.

According to the embodiment of the present disclosure, a member for guiding and condensing light for forming a plurality of light distribution patterns may be formed as a single body, thereby implementing component simplification. Further, according to the embodiment of the present disclosure, assembly may be simplified, assembly tolerance may be minimized, and thus light efficiency may be improved.

According to an embodiment of the present disclosure, a member for guiding and condensing light for forming a plurality of light distribution patterns may be formed as a single body, thereby implementing component simplification.

According to an embodiment of the present disclosure, assembly may be simplified, assembly tolerance may be minimized, and thus light efficiency may be improved.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

What is claimed is:

1. A vehicle lamp comprising:
- a first light source unit including a plurality of first light source parts disposed along a first side of the vehicle lamp in a left-right direction;
- a second light source unit including a plurality of second light source parts disposed along a second side of the vehicle lamp in the left-right direction opposite the first light source unit;
- a first total reflection lens including a first lens structure configured to condense light radiated from the plurality of first light source parts and to emit the light to a front side of the vehicle lamp;
- a second total reflection lens formed integrally with a plurality of second lens structures configured to condense light radiated from the plurality of second light source parts and to emit the light to the front side of the vehicle lamp, and formed integrally side-by-side with the first total reflection lens; and
- an emission lens including a first emission lens part disposed adjacent to the first total reflection lens on front side of the vehicle lamp and a second emission lens part disposed adjacent to the second total reflection lens on front side of the vehicle lamp,
- wherein a first light distribution pattern is formed by light emitted from the first emission lens part,
- wherein a second light distribution pattern different from the first light distribution pattern is formed by light emitted from the second emission lens part, and
- wherein the first light distribution pattern and the second light distribution pattern overlap each other to form a high beam pattern.

2. The vehicle lamp of claim 1, wherein the first emission lens part includes a first incident surface on which light output from the first total reflection lens is incident and a first emission surface from which the incident light is output,
- wherein the second emission lens part includes a second incident surface on which light output from the second total reflection lens is incident and a second emission surface from which the incident light is output, and
- wherein the first incident surface and the second incident surface have different shapes.

3. The vehicle lamp of claim 2, wherein the first lens structure includes:
- a $(1-1)^{th}$ light incident portion on which light is incident;
- a $(1-2)^{th}$ light incident portion disposed on both sides of the $(1-1)^{th}$ light incident portion in the left-right direction; and
- a first body portion integrally formed adjacent to the $(1-1)^{th}$ light incident portion and the $(1-2)^{th}$ light incident portion.

4. The vehicle lamp of claim 3, wherein the first body portion includes an integrated light output surface from which the light incident from the $(1-1)^{th}$ light incident portion and the $(1-2)^{th}$ light incident portion is emitted to the front side of the vehicle lamp, and
- wherein the integrated light output surface is a curved surface, and a cross-sectional shape of the integrated light output surface in the left-right direction is concavely curved in a direction toward the first light source unit.

5. The vehicle lamp of claim 4, wherein a central axis of the $(1-2)^{th}$ light incident portion is formed at an angle different from that of a central axis of the $(1-1)^{th}$ light incident portion, and
- wherein central axes of the $(1-2)^{th}$ light incident portions are formed to be symmetrical to each other with respect to the central axis of the $(1-1)^{th}$ light incident portion.

6. The vehicle lamp of claim 5, wherein a path of the light incident from the $(1-1)^{th}$ light incident portion forms a horizontal focal point on the integrated light output surface, and
- wherein an optical path by a first portion of the light incident from the $(1-2)^{th}$ light incident portion forms a same horizontal focal point as the horizontal focal point by the $(1-1)^{th}$ light incident portion on the integrated light output surface, and an optical path of a second portion thereof is defocused on the integrated light output surface.

7. The vehicle lamp of claim 4, wherein the first body portion includes:
- a first lower surface; and
- a first upper surface disposed above the first lower surface,
- wherein the first upper surface is inclined downward toward the integrated light output surface.

8. The vehicle lamp of claim 2, wherein each of the plurality of second lens structures includes:
- a second light incident portion on which light is incident; and
- a second body portion disposed adjacent to the second light incident portion and having an individual light output surface through which the light is emitted to the front side of the vehicle lamp,
- wherein the plurality of individual light output surfaces in the plurality of second lens structures are formed on different planes.

9. The vehicle lamp of claim 8, wherein light guided by the plurality of second lens structures forms a plurality of vertical focal points based on a vertical direction, and
- wherein the plurality of vertical focal points are formed on the individual light output surfaces and are bent in bent directions of the individual light output surfaces.

10. The vehicle lamp of claim 8, wherein the second body portion includes:
- a second lower surface; and
- a second upper surface disposed above the second lower surface, and
- wherein the second upper surface is inclined downward toward the individual light output surface.

11. The vehicle lamp of claim 2, wherein the first incident surface is convex in a direction toward the first total reflection lens based on the left-right direction, and
- wherein the first emission surface is convex toward the front side of the vehicle lamp based on the left-right direction.

12. The vehicle lamp of claim 2, wherein the second incident surface is bent in a direction toward the second total reflection lens from a first end of the vehicle lamp to a second end of the vehicle lamp in the left-right direction, and wherein the second emission surface is bent in a shape corresponding to the second incident surface based on the left-right direction.

13. The vehicle lamp of claim 2, wherein the first emission surface and the second emission surface are continuous.

* * * * *